United States Patent

Wild et al.

[11] Patent Number: 4,509,948
[45] Date of Patent: Apr. 9, 1985

[54] CATIONIC MONO- AND DIS-AZO DYESTUFFS, AND THEIR PREPARATION AND USE FOR DYEING PAPER AND CATIONIC DYEABLE SUBSTRATES

[75] Inventors: Peter Wild, Odenthal; Frank-Michael Stöhr, Burscheid, both of Fed. Rep. of Germany

[73] Assignee: Bayer Aktiengesellschaft, Leverkusen, Fed. Rep. of Germany

[21] Appl. No.: 520,675

[22] Filed: Aug. 5, 1983

[30] Foreign Application Priority Data

Aug. 24, 1982 [DE] Fed. Rep. of Germany ....... 3231398

[51] Int. Cl.³ .......................... C08J 3/20; C09B 29/32; D06P 1/41
[52] U.S. Cl. ............................................ 8/539; 8/437; 8/654; 8/691; 8/918; 8/919; 8/922; 8/924; 8/927; 534/603; 534/604; 534/614
[58] Field of Search ................... 8/539, 654; 260/174, 260/157, 158, 160, 193

[56] References Cited

U.S. PATENT DOCUMENTS

| 3,828,019 | 8/1974 | Junker et al. | 260/157 |
| 4,080,321 | 3/1978 | Kunstmann et al. | 260/157 |
| 4,225,492 | 9/1980 | Bauer et al. | 260/157 |

FOREIGN PATENT DOCUMENTS

| 2250676 | 5/1973 | Fed. Rep. of Germany . |
| 3133360 | 3/1983 | Fed. Rep. of Germany . |
| 1579408 | 11/1980 | United Kingdom . |

Primary Examiner—A. Lionel Clingman
Attorney, Agent, or Firm—Sprung, Horn, Kramer & Woods

[57] ABSTRACT

Cationic dyestuffs of the general formula

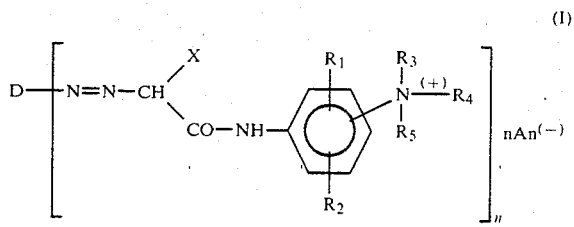

wherein
D is the radical of a diazo component free of anionic groups,
X is a radical of the formula $COCH_3$, $CN$, $COOCH_3$, $COOC_2H_5$, $CONH_2$ or $COC_6H_5$,
$R_1$ and $R_2$ independently of each other are hydrogen or a nonionic substituent and
$R_3$, $R_4$ and $R_5$ independently of one another are alkyl, alkenyl or aralkyl, or
$R_3$ and $R_4$, together with the nitrogen to which they are bonded, form a 5- or 6-membered heterocyclic ring,
n is 1 or 2 and
$An^{(-)}$ is an anion, and
wherein the cyclic and acyclic radicals can in turn be substituted, are used for dyeing synthetic and natural cationically dyeable materials, such as cotton, paper, leather, polyacrylnitrile or acid-modified polyester or polyamide fibres.

9 Claims, No Drawings

CATIONIC MONO- AND DIS-AZO DYESTUFFS, AND THEIR PREPARATION AND USE FOR DYEING PAPER AND CATIONIC DYEABLE SUBSTRATES

The invention relates to a cationic dyestuff of the general formula

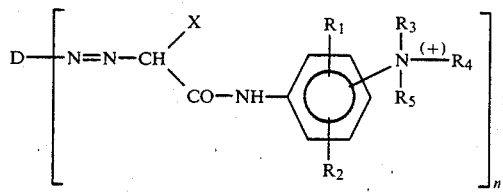

wherein

D is the radical of a diazo component free of anionic groups,

X is a radical of the formula $COCH_3$, $CN$, $COOCH_3$, $COOC_2H_5$, $CONH_2$ or $COC_6H_5$, $R_1$ and $R_2$ independently of each other are hydrogen or a nonionic substituent and $R_3$, $R_4$ and $R_5$ independently of one another are alkyl, alkenyl or aralkyl, or $R_3$ and $R_4$, together with the nitrogen to which they are bonded, form a 5- or 6-membered heterocyclic ring, n is 1 or 2 and $An^{(-)}$ is an anion, and wherein the cyclic and acyclic radicals can in turn be substituted, to their preparation and to their use in dyeing synthetic or natural cationically dyeable materials, such as cotton, paper, leather, polyacrylnitrile or acid-modified polyester or polyamide fibres.

D represents in particular a mono- or bis-diazo component of the benzene, naphthalene, thiazole, benzothiazole, benzoisothiazole or thiadiazole series.

Examples of the nonionic substituents $R_1$ and $R_2$ are halogen, in particular fluorine, chlorine or bromine, $C_1$–$C_4$-alkyl and $C_1$–$C_4$-alkoxy.

Anions $An^{(-)}$ are the colourless organic and inorganic anions customary for cationic dyestuffs, for example chloride, bromide, iodide, hydroxide, hydrogenphosphate, phosphate, carbonate, hydrogencarbonate, perchlorate, fluoroborate, chlorozincate, methosulphate, ethosulphate, acetate, formate, propionate, lactate, citrate, benzenesulphonate, toluenesulphonate, sulphate, hydrogensulphate or nitrate.

The anion is generally given by the method of preparation. The dyestuffs are preferably in the form of chlorides, hydrogensulphates, sulphates, methosulphates, carbonates, hydrogencarbonates, phosphates, formates, acetates, lactates or citrates. The anions can be replaced by other anions in a known manner, and can be in the form of mixtures.

Alkyl radicals are to be understood as meaning in particular those which have 1–8 C atoms, and alkenyl radicals as those which have 2–4 C atoms.

Examples of substituents of the alkyl radicals are halogen, hydroxyl, $C_1$–$C_4$-alkoxy, cyano, amino, and mono- and di-$C_1$–$C_4$-alkylamino. Halogen preferably represents fluorine, chlorine or bromine.

Aralkyl preferably represents benzyl or phenylethyl, either of which can be substituted, for example by fluorine, chlorine, bromine, $C_1$–$C_4$-alkyl, $C_1$–$C_4$-alkoxy, nitro or cyano.

The radicals $R_3$ and $R_4$ joined together with the nitrogen atom, can form, for example, an optionally substituted pyrrolidine, piperidine, morpholine or piperazine ring.

Of dyestuffs of the formula (I), those dyestuffs are preferred which have the formula

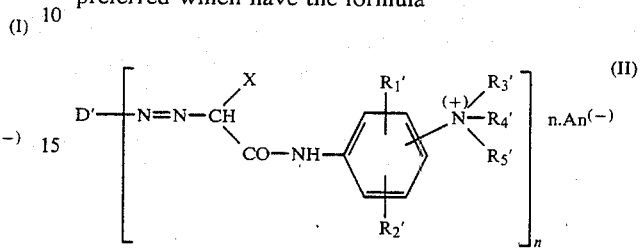

wherein n, X and $An^{(-)}$ have the meaning of the formula (I), $D'$ denotes a radical of the formula

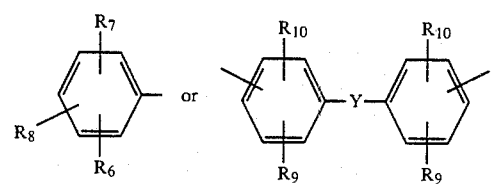

$R_1'$ and $R_2'$ independently of each other denote hydrogen, $C_1$- to $C_4$-alkyl, $C_1$- to $C_4$-alkoxy, fluorine, chlorine or bromine, and $R_3'$, $R_4'$ and $R_5'$ independently of one another denote $C_1$- to $C_4$-alkyl, $C_3$- or $C_4$-alkenyl, benzyl or phenylethyl, either of which can be substituted by hydroxyl, $C_1$- to $C_4$-alkoxy, chlorine, bromine or cyano, and the benzyl and phenylethyl radicals additionally by $C_1$- to $C_4$-alkyl, or $R_3$ and $R_4'$, together with the nitrogen atom to which they are bonded, form an optionally $C_1$- to $C_4$-alkyl substituted pyrrolidine, morpholine, piperidine or piperazine ring, $R_6$ and $R_7$ independently of each other represent hydrogen, $C_1$- to $C_4$-alkyl, $C_1$- to $C_4$-alkoxy, fluorine, chlorine, bromine or NH-AC, represents $C_1$- to $C_4$-alkylcarbonyl, -alkylsulphonyl or -alkylcarbamyl, benzoyl, toluoyl, phenylsulphonyl, phenylcarbamoyl, tolylsulphonyl, tolylcarbamoyl or optionally substituted triazinyl, $R_8$ represents hydrogen, $C_1$- to $C_4$-alkyl, $C_1$–to $C_4$-alkoxy, chlorine, bromine, NH-Ac or a radical of the formula

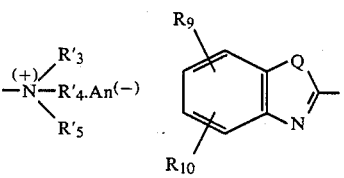

-continued

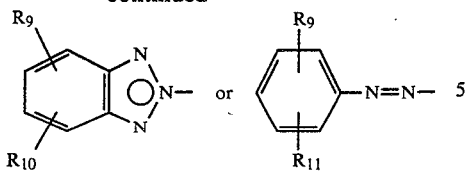

$R_9$–$R_{11}$ independently of one another represent hydrogen, $C_1$- to $C_4$-alkyl, $C_1$- to $C_4$-alkoxy, chlorine or bromine and $R_{11}$ additionally represents

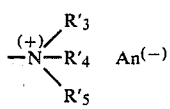

Q represents O, S or NH and
Y represents a direct bond or a bridging link.

An example which may be mentioned of Ac (=optionally substituted triazinyl) is the radical

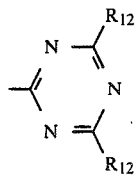

wherein $R_{12}$ has the meaning given below. Preferred examples of the bridging link Y are

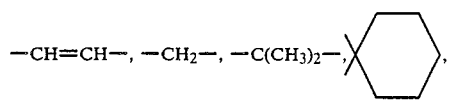

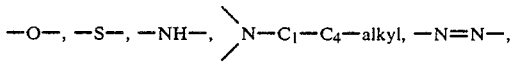

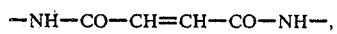

—NH—CO—CH=CH—CO—NH—,

—NH—CO—CH$_2$—CH$_2$—CO—NH— and 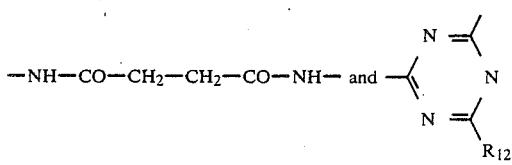

where $R_{12}$ represents alkyl, aryl,

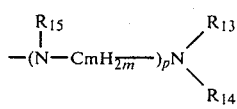

—O—$R_{15}$ or —S—$R_{15}$, m represents 2 or 3, p represents 0 or 1 and $R_{13}$, $R_{14}$ and $R_{15}$ denote hydrogen, alkyl, alkenyl, aryl, aralkyl or cycloalkyl or $R_{13}$ and $R_{14}$, together with the N atom to which they are bonded, form a 5- or 6-membered ring or $R_{13}$ denotes amino.

Preferred $R_{12}$ is $R_{12}'$ which represents $C_1$- to $C_4$-alkyl or phenyl which can be substituted by hydroxyl, $C_1$- to $C_4$-alkoxy, chlorine or bromine and phenyl additionally by $C_1$- to $C_4$-alkyl, or

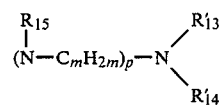

—O—$R_{15}'$ or —S—$R_{15}'$ and $R_{13}'$, $R_{14}'$ and $R_{15}'$ independently of one another denote hydrogen, optionally hydroxyl-, halogen-, cyano- or $C_1$–$C_4$-alkoxy-substituted $C_1$–$C_4$-alkyl, $C_2$–$C_4$-alkenyl or optionally halogen-, $C_1$–$C_4$-alkyl-, hydroxyl- or $C_1$–$C_4$-alkoxy-substituted benzyl, phenylethyl, phenyl, naphthyl or cyclohexyl, or $R_{13}'$ and $R_{14}'$, together with the N atom to which they are bonded, form an optionally $C_1$–$C_4$-alkyl-substituted pyrrolidine, piperidine, morpholine or piperazine, whose external nitrogen atom can be alkylated or quaternised by optionally OH- or NH$_2$-substituted $C_1$–$C_4$-alkyl.

Examples which may be mentioned in particular of the substituent $R_{17}$ are amino, methylamino, dimethylamino, ethylamino, diethylamino, 2-hydroxyethylamino, bis(2-hydroxyethyl)-amino, allylamino, diallylamino, methoxyethylamino, sulphatoethylamino, carboxymethylamino, N-methyl-N-carboxymethylamino, carboxyethylamino, N-methyl-N-sulphomethylamino, sulphoethylamino, N-methyl-N-sulphoethylamino, cyclohexylamino, pyrrolidino, piperidino, 1-methylpiperazino, 1-($\beta$-aminoethyl)piperazino, 1-($\beta$-hydroxyethyl)piperazino, morpholino, 4-morpholinamino, benzylamino and optionally substituted phenylamino or naphthylamino.

Particularly preferred dyestuffs have the general formula

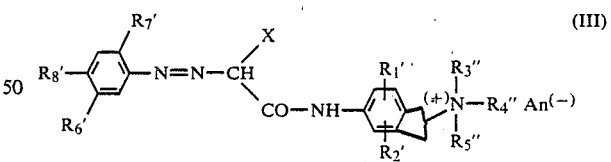 (III)

wherein $R_6'$ denotes hydrogen, methoxy, ethoxy, methyl, ethyl, fluorine, chlorine, bromine or NH-Ac, $R_7'$ denotes hydrogen, fluorine, chlorine, bromine, methoxy, ethoxy, methyl or ethyl and $R_8'$ denotes hydrogen, methoxy, ethoxy, methyl, ethyl, or a radical of the formula

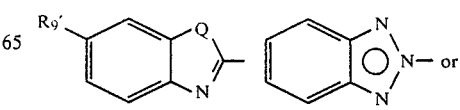

-continued

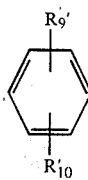

$R_1'$, $R_2'$, $R_9'$ and $R_{10}'$ independently of one another denote hydrogen, fluorine, chlorine, bromine, methoxy, ethoxy, methyl or ethyl and $R_3''$, $R_4''$ and $R_5''$ independently of one another denote $C_1$ to $C_4$-alkyl, $\beta$- or $\gamma$-hydroxy-$C_2$- to $C_4$-alkyl or benzyl, or $R_3''$ and $R_4''$, together with the nitrogen form a pyrrolidine, morpholine or piperidine ring and X and $An^{(-)}$ have the meaning of the formula (I).

Of dyestuffs of the formula (I), those are also preferred which have the general formula

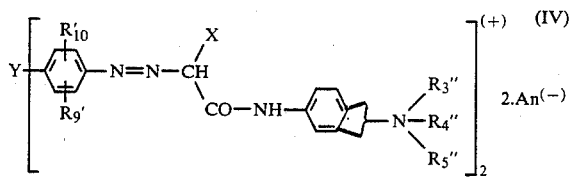

wherein the symbols have the meaning of the formulae (I), (II) and (III).

Of the dyestuffs of the formulae (III) and (IV) those are noteworthy in which $X=CO-CH_3$.

Dyestuffs of the general formula (I) are obtained by diazotising amines of the formula

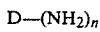   (V)

and coupling the diazotised product with compounds of the formula

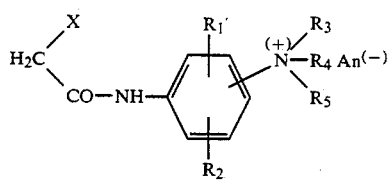

where the symbols have the meaning given in Formula (I).

Compounds of the formula (VI), their preparation and their use as coupling components in the preparation of azo dyestuffs are also part of the subject matter of the invention. They are prepared in a manner known in itself by reacting amines of the formula

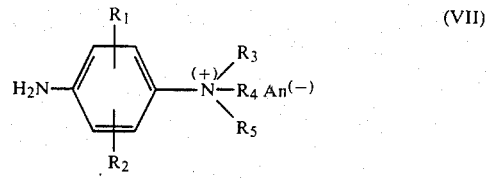

in a manner known in itself with one of the following reagents: diketene, methyl acetoacetate, ethyl acetoacetate, ethyl cyanoacetate, methyl cyanoacetate, dimethyl malonate, diethyl malonate, methyl malonamate, malonic acid monomethyl ester imino ester and methyl benzoylacetate.

The amines (V) are diazotised in a known manner at temperatures between 0 and 50° C., and the following are examples of monoaminobenzenes which can be used: aniline, o-anisidine, o-toluidine, o-phenetidine, p-anisidine, p-phenetidine, p-toluidine, m-anisidine, m-toluidine, 2-methoxy-4-methylaniline, 2-methyl-4-methoxyaniline, o-chloroaniline, m-chloroaniline, p-chloroaniline, 2-(4'-aminophenyl)-benzothiazole, 2-(4'-aminophenyl)-6-methylbenzothiazole, 2-(4'-amino-3'-methylphenyl)-4,6-dimethylbenzothiazole, 2-(4'-aminophenyl)-benzimidazole, 2-(4'-aminophenyl)-benzoxazole, 2-(4'-aminophenyl)-benzothiazole, 2-(4'-amino-3'-methylphenyl)-benzothiazole, 2-(4'-amino-3'-methoxyphenyl)-benzotriazole, 2-(4'-aminophenyl)-5-methylbenzothiazole, 4-aminoazobenzole 4-amino-2,3'-dimethylazobenzole, 4-amino-benzanilide, and 4'-amino-benzanilide.

Examples of diamines of the general formula (V) where n'2 are 4,4'-diaminoazobenzene, 3,3'-dimethylbenzidine, 4,4'-diaminobenzanilide, 2-(4-aminophenyl)-5-amino-2H-benzotriazole, 3,3'-dichlorobenzidine, 4,4'-diaminobenzophenon, 2-(4-aminophenyl)-5-amino-benzimidazole, 4,4'-diamino-N,N'-diphenylurea, 4,4'-diaminodiphenylamine, 1,2-bis-(4'-aminophenyl)-ethane, 4,4'-diaminodiphenylamine, 1,2-bis-(4'-aminophenyl)-methane, 2,2-bis-(4-aminophenyl)-propane, 1,1-bis-(4-aminophenyl)-cyclohexane, 4,4'-diaminostilbene, 3,3'-dianisidine, 4,4'-diaminodiphenylsulphide, 2,4-bis[(3'-aminophenylamino)-6-dimethylamino-triazine and other phenylenediamines which are linked to cyanuric chloride and of which the following formulae are examples:

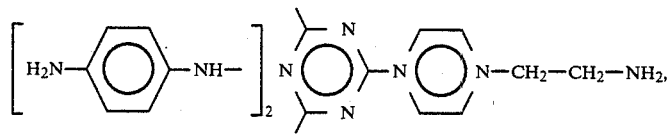

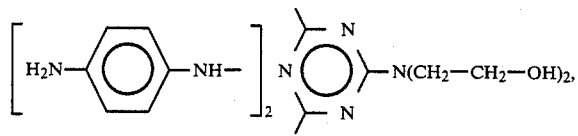

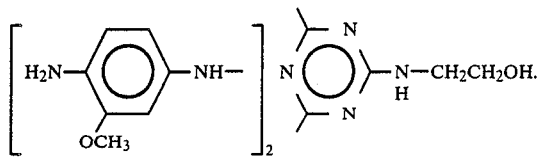

The coupling customarily takes place at temperatures between 0° and 50° C., preferably at temperatures between 0° and 30° C., at pH 2–9, preferably pH 3–5. The dyestuffs can be isolated and dried, but they can also be combined with suitable solvents to give stable concentrated solutions.

Examples of such solutions are aqueous solutions of mineral acids and/or organic acids, for example hydrochloric acid, sulphuric acid, phosphoric acid, formic acid, acetic acid, glycolic acid, lactic acid or methane sulphonic acid.

The solvents used or co-used can also be organic solvents, such as, for example, ethylene glycol, diglycol, triglycol, glycerol, ethyl glycol monomethyl ether, diglycol monoethyl ether, diglycol monobutyl ether or the like.

The dyestuffs of the invention dye cationically dyeable material, such as, for example, polyacrylnitrile, acid-modified polyesters and polyamide, wool or leather, but even cellulose-containing materials, such as, for example, cotton or regenerated cellulose fibres, in particular paper, in orange to yellow shades having good fastness properties.

The dyestuffs can also be used for top- or surface-dyeing paper. They are suitable for sized and unsized types of paper which are made from bleached or unbleached pulp of various origins, such as softwood or hardwood sulphite and/or sulphate pulp.

Dyeing preferably takes place at pH 4–8, in particular pH 5–7. The dyeing temperature is generally 10° to 50° C., preferably about 20° C.

The auxiliaries and fillers customarily used in the dyeing and production of paper can also be used when dyestuffs of the invention are used. The dyestuffs have excellent affinity for paper.

The dyeings on paper obtained with dyestuffs of the invention are distinguished by very good water fastness (fastness to bleeding) and acid, alkali and alum fastness. However, the surprisingly high light fastness of dyeings on paper should be stressed. Also noteworthy is the brilliance and clarity of the yellow to orange shades. The dyestuffs of the invention are also highly compatible with suitable dyestuffs.

The dyestuffs can also be used for dyeing cotton and regenerated cellulose fibres without hitherto customary auxiliaries, such as, for example, a mordanting pretreatment, having to be used; the addition of salt can also be dispensed with.

Dyeing then preferably takes place at pH 4–8, in particular at pH 5–7. The dyeing temperature is generally 60° to 130° C., preferably 80° to 100° C.

Preparation of coupling components

EXAMPLE 1

0.5 mol=90 g of 2-amino-4-acetylaminoanisole are suspended in 500 ml of water and are admixed with 120 ml dimethyl sulphate in the course of 3 hours, during which pH 6 is maintained. When the quaternisation has ended, the solution obtained is boiled for 3 hours together with 70 ml of concentrated hydrochloric acid to hydrolyse the acetyl group. After the hydrolysis, the solution is cooled down to 20° C. and is brought to a pH 3 with sodium carbonate, and 46 g of diketene are added dropwise in the course of 1 hour, during which pH 3 is maintained with 20% strength sodium carbonate solution. This gives a solution of 0.45 mol of the compound of the formula

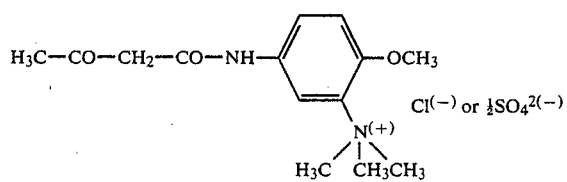

The solution can be used directly for preparing azo dyestuffs.

If sodium perchlorate is added to this solution, trimethyl-(2-methoxy-5-acetoacetylaminophenyl)ammonium perchlorate is precipitated virtually quantitatively.

$^1$H-NMR-Data in DMSO-d$_6$: δ(ppm)=2.22, s, 3H; 3.58, s, 2H; 3.66, s, 9H; 3.99, s, 3H; 7.4, broad d, 1H; 7.78, m, 1H, 8.18, d, 1H; 10.35 broad s, 1H.

The arylides can be precipitated with KBr, NaI, zink chloride solution or other suitable salts in the form of salts with the corresponding anions.

The following acetoacetyl derivatives are prepared analogously:

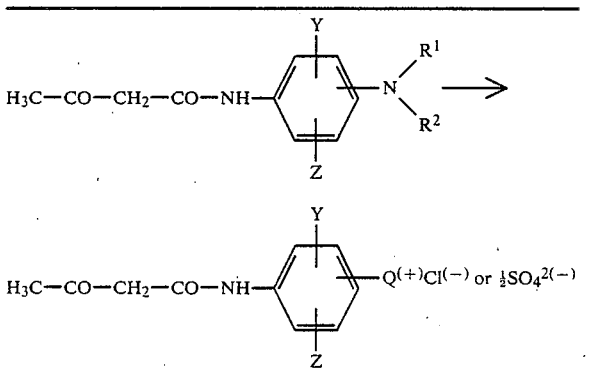

| Example No. | $-N\begin{matrix}R^1\\R^2\end{matrix}$ | Y | Z | Q |
|---|---|---|---|---|
| 2 | 2-NH$_2$ | H | H | 2-N(CH$_3$)$_3$ |
| 3 | 3-NH$_2$ | H | H | 3-N(CH$_3$)$_3$ |
| 4 | 4-NH$_2$ | H | H | 4-N(CH$_3$)$_3$ |
| 5 | 4-NH$_2$ | 3-Cl | 6-Cl | 4-N(CH$_3$)$_3$ |
| 6 | 3-NH$_2$ | 6-CH$_3$ | H | 3-N(CH$_3$)$_3$ |
| 7 | 3-NH$_2$ | 4-CH$_3$ | H | 3-N(CH$_3$)$_3$ |
| 8 | 4-NH$_2$ | 3-CH$_3$ | H | 4-N(CH$_3$)$_3$ |
| 9 | 2-NH$_2$ | 4-CH$_3$ | H | 2-N(CH$_3$)$_3$ |

-continued

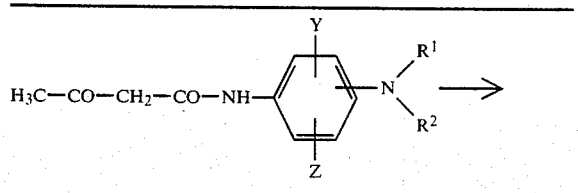

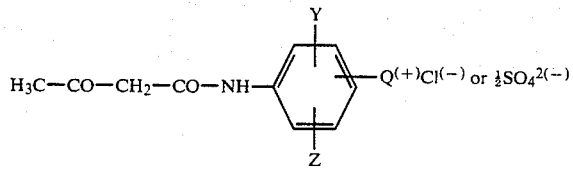

| Example No. | $-N<^{R^1}_{R^2}$ R² | Y | Z | Q |
|---|---|---|---|---|
| 10 | 3-NH₂ | 4-OCH₃ | H | 3-N(CH₃)₃ |
| 11 | 4-NH₂ | 2-OCH₃ | H | 4-N(CH₃)₃ |
| 12 | 4-NH₂ | 2-OCH₃ | 5-Cl | 4-N(CH₃)₃ |
| 13 | 2-NH₂ | 4-OC₂H₅ | H | 2-N(CH₃)₃ |
| 14 | 3-N(C₂H₄OH)₂ | 4-OCH₃ | H | 3-N(C₂H₄OH)₂CH₃ |
| 15 | 3-N(CH₃)₂ | H | H | 3-N(CH₃)₃ |
| 16 | 4-N(C₂H₅)₂ | H | H | 4-N(C₂H₅)₂CH₃ |

If Examples 1–16 are carried out with diethyl sulphate in place of dimethyl sulphate, the corresponding N-ethylammonium compound is obtained. The N-acetyl compound can be replaced by N-formyl, benzoyl or oxalyl compounds.

EXAMPLE 17

Example 1 is repeated, except that the reaction is carried out in a pressure vessel, the methylation is performed with methyl chloride under ≈3–4 bar and pH 7 is maintained with 40% sodium hydroxide solution, affording trimethyl-(2-methoxy-5-acetoacetylaminophenyl)ammonium chloride free of sulphate ions. The chloride can be isolated from the solution in a rotary evaporator in the form of a solid which is only contaminated with sodium chloride. The same applies to Examples 2–16.

EXAMPLE 18

0.5 mol=94 g of trimethyl-(3-aminophenyl)ammonium chloride (m-Janus base), prepared by reducing the corresponding nitro compound (with H₂/Ni), are dissolved at pH 3.5 in 500 ml of water and admixed with 46 g of diketene in the course of 1 hour. The pH value is maintained with 20% strength sodium carbonate solution. This gives a solution of 0.48 mol=95% of theory of the acetoacetyl m-Janus base of the formula

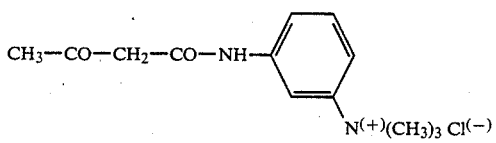

which can be used directly for preparing azo dyestuffs. The perchloride precipitated with sodium perchlorate has the following ¹H-NMR-data (DMSO, TMS=0 ppm): δ=2.25, s, 3H; 3.58, s, 2H; 3.63, s, 9H, 7.58, m, 3H; 8.15, m, 1H; 10.28, broad s, 1H.

The following arylides are prepared in an analogous manner.

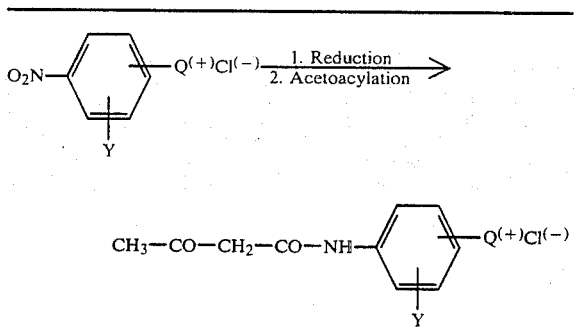

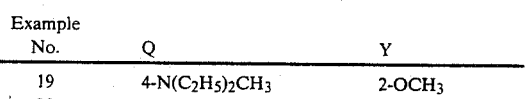

| Example No. | Q | Y |
|---|---|---|
| 19 | 4-N(C₂H₅)₂CH₃ | 2-OCH₃ |
| 20 | 3-N(CH₃)₂C₂H₅ | 4-OCH₃ |
| 21 | 3-N(CH₃)₃ | 4-OC₂H₅ |
| 22 | 4-N(CH₃)₃ | 2-Cl |
| 23 | 2-N(CH₃)₃ | 4-Cl |
| 24 | 3-N(CH₃)₃ | 6-Cl |
| 25 | 4-N(C₂H₅)₂CH₃ | H |
| 26 | 4-N⟨morpholino⟩CH₃ | H |
| 27 | 3-N(CH₃)₂C₂H₅ | 4-CH₃ |
| 28 | 4-N(C₂H₅)₃ | 3-CH₃ |
| 29 | 4-N(C₂H₄OH)CH₃ | H |
| 30 | 4-N(C₂H₅)₂CH₃ | 3-OCH₃ |
| 31 | 3-N(CH₃)₃ | 4-OCH₃ |

EXAMPLE 32

0.5 mol=109 g of trimethyl-(3-amino-4-methoxyphenyl)ammonium chloride are dissolved in 300 ml of water and admixed at pH 6 and 45°14 50° C. with 100 g of methyl acetoacetate in the course of 1 hour. The pH value is maintained with sodium hydrogencarbonate. This gives a solution of 0.4 mol=80% of theory of the compound

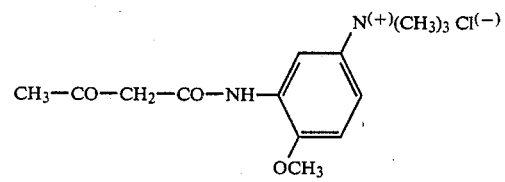

The perchlorate has the following ¹H-NMR-data in DMSO-d₆: δ(TMS=0): 2.24, s, 3H; 3.60, s, 9H; 3.75, s, 2H;, 3.97, s, 3H; 7.26, d, 1H; 7.71, dd, 1H; 8.69, d, 1H; 9.8, broad s, 1H.

EXAMPLE 33

Example 32 is repeated, except that 90 g of methyl cyanoacetate are used, affording an aqueous solution of 0.43 mol=80% of theory of the compound

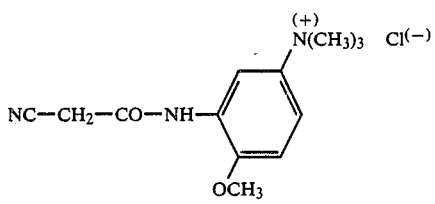

The perchloride has the following $^1$H-NMR-data in DMSO-d$_6$: δ(TMS=0): 3.61, s, 9H; 3.79, s, 2H; 3.96, s, 3H; 7.26, d, 1H; 7.70, dd, 1H; 8.71, d, 1H; 10.15, broad s, 1H.

If dimethyl malonate is used in place of methyl cyanoacetate, a solution is obtained of the corresponding malonomate

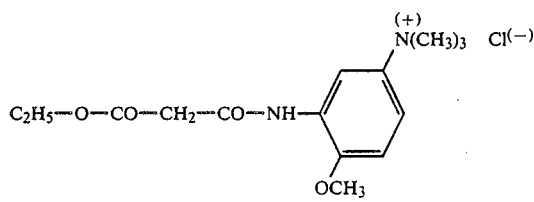

The following cyanoacetamides or malonamates of other Janus bases are prepared analogously:

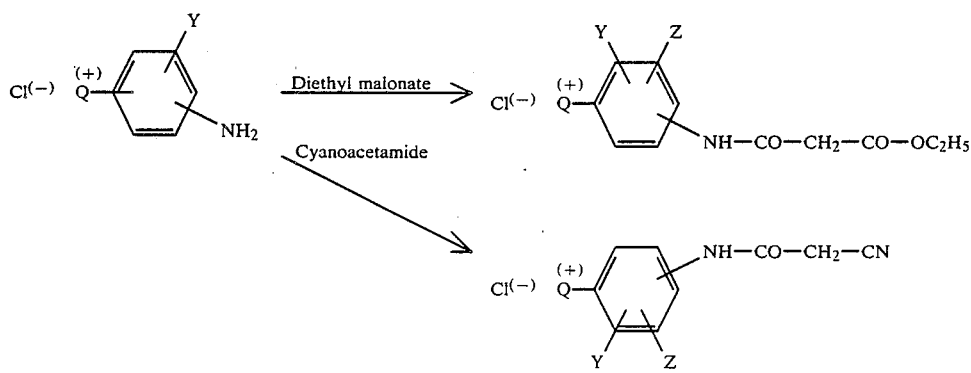

where Q, Y and Z are in each case the substituents of Examples 2-16 and 19-23.

PREPARATION OF DYESTUFFS

EXAMPLE 34

0.25 mol = 60 g of dehydrothio-p-toluidine (2-(4'-aminophenyl)-6-methylbenzothiazole) are suspended in 800 ml of water and 65 ml of crude hydrochloric acid. A conventional diazotisation is then carried out with 60 ml of a 30% strength NaNO$_2$ solution. The mixture is stirred for 1 hour and excess nitrite is destroyed with amidosulphonic acid. 0.25 mol of the arylide solution prepared in Example 1 are brought to a pH 7-7.5 with NaHCO$_3$ and admixed with the suspension of the above diazotisation in the course of 0.5 hours, during which the pH 4 is maintained with NaHCO$_3$. The coupling has ended after 0.5 hours, and the precipitated dyestuff of the formula

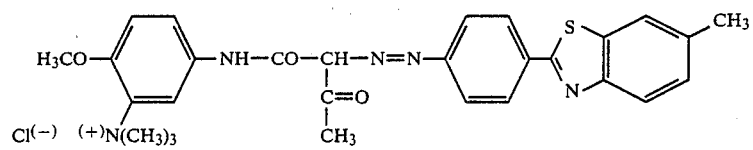

is filtered off with suction. $\lambda_{max}$ = 393 nm; yield: 95% of theory.

The paste can be dried, or be processed with formic acid into a stable solution which contains 15% of dyestuff, 30% of formic acid and 55% of water. Both the powder and the solution give brilliant greenish-yellow dyeings on paper, cotton, leather and polyacrylnitrile.

EXAMPLE 35

Example 34 is repeated, except that a solution of the arylide of Example 18 is used as coupling component and NaCl is added for isolating the product, affording in a 95% yield, the dyestuff of the formula

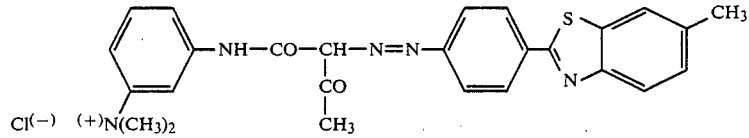

$\lambda_{max}$: 394 nm

The dyestuff can be used not only as a powder but also as a solution, for example 15% of dyestuff, 35% of glacial acetic acid and 50% of water, for dyeing paper and cotton and produces greenish-yellow dyeings having good light fastness.

EXAMPLE 36

Example 34 is repeated, except that the arylide of Example 32 is used as coupling component, affording, in a 95% yield, the dyestuff of the formula

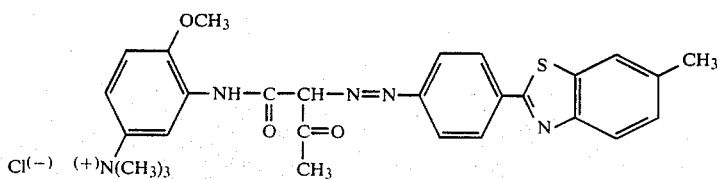

$\lambda_{max}$:389 nm which has the same dyeing properties.

If the arylides described in Examples 2–16 and 19–31 are used, the diazonium salt of dehydro-p-thiotoluidine gives likewise valuable dyestuffs of the formula

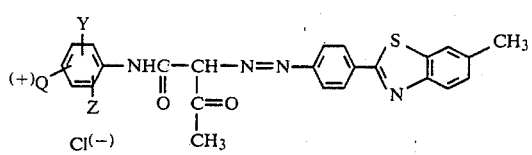

where Q, Y and Z are in each case the substituents of Examples 2–16 and 19–31, which have $\lambda_{max}$ values of 395±5 nm and give not only as a powder but also as a solution greenish-yellow, fast dyeings on paper and cotton.

EXAMPLE 37

0.25 mol=52 g of 2-(4'-aminophenyl)benzimidazole are diazotised in 700 ml of water and 65 ml of 30% strength hydrochloric acid with 60 ml of a 30% strength sodium nitrite solution. The resulting suspension of the diazonium compound is added to a solution of 0.25 mol of the arylide described in Example 11 and coubled therein in the manner described in Example 34, and the precipitated dyestuff of the formula

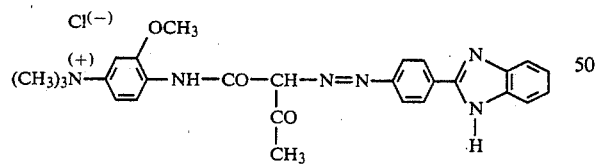

is isolated. $\lambda_{max}$: 391 nm. As a powder and as a 13% strength solution in 30% strength formic acid it produces brilliant greenish-yellow dyes on cotton, paper, leather and polyacrylnitrile.

If the arylide of Example 11 is replaced by those of Examples 1–10, 12–16 and 19–32 and the method of Example 37 is followed, valuable dyestuffs are obtained which have the formula

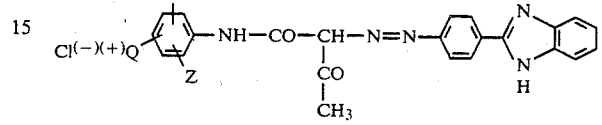

and which, as powder or solution, dye paper and cotton in fast greenish-yellow shades. Q, Y and Z are in each case the substituents of the arylides described in Examples 1–10, 12–16 and 19–32.

EXAMPLE 38

0.1 mol=19 g of 4-aminobenzene are stirred into 300 ml of water and 25 ml of 30% strength hydrochloric acid. The mixture is cooled down to 5° C. and is then diazotised with 24 ml of a 30% strength sodium nitrite solution. This diazotisation mixture is added to 0.1 mol=200 ml of the arylide of Example 1 and coupling takes place at pH 4 and 5°–10° C. The dyestuff of the formula

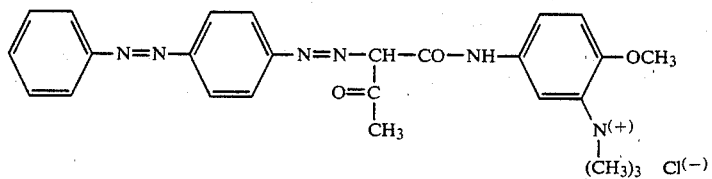

is filtered off with suction; $\lambda_{max}$:401 nm. It dyes paper and cotton in light-fast bright yellow shades.

EXAMPLE 39

If the diazo component used is 0.1 mol of an aminoazobenzene of the formula

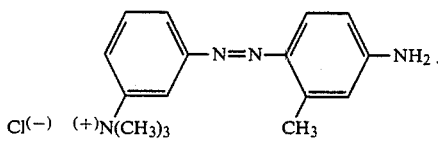

and the procedure followed is that of Example 38, a solution is obtained of the dyestuff of the formula

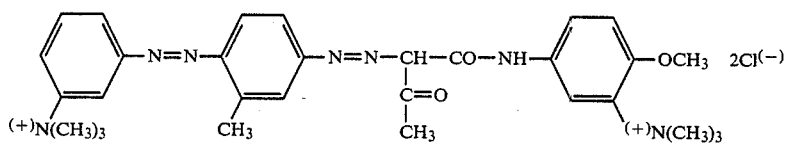

which is precipitated with KBr as the bromide. $\lambda_{max}$: 409 nm. The solution as well as the isolated dyestuff produce on paper and cotton fast yellow dyeings.

EXAMPLE 40

If the diazo component used is an aminoazobenzene of the formula

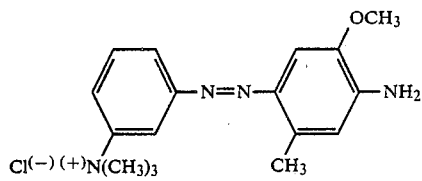

and the procedure followed is that of Examples 38, the corresponding dyestuff is obtained, which dyes paper and cotton in orange shades. $\lambda_{max}$: 419 nm.

If Examples 38–40 are repeated with the arylides of Examples 2–16 and 18–32 in place of arylide 1, likewise valuable dyestuffs are obtained which have the formula

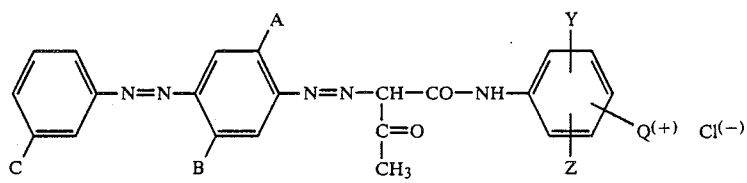

where Q, Y and Z are in each case the substituents of the arylides of Examples 1–16 and 18–32 and A, B and C in the Example 38 series each represent H, in the Example 39 series A=H, B=CH$_3$ and C=$^{(+)}$N(CH$_3$)$_3$Cl$^{(-)}$ and in the Example 40 series A=OCH$_3$, B=CH$_3$ and C=$^{(+)}$N(CH$_3$)$_3$Cl$^{(-)}$. They give yellow to orange fast dyeings on paper and cotton.

EXAMPLE 41

0.25 mol=56.7 g of 4,4'-diaminobenzanilide are added to 700 ml of water, and the mixture is stirred for 4 hours, is then admixed with 140 ml of 30% strength hydrochloric acid and is diazotised with 114 ml of a 30% strength nitrite solution in the course of 1 hour. A temperature of 20°–26° C. is maintained with ice. The tetrazotisation mixture turns into a solution. The solution is stirred for 1 hour and then has its excess nitrite destroyed with amidosulphonic acid. The tetrazotisation solution is added to 0.5 mol of the solution (about 1.1 litres) described in Example 1 in the course of 1 hour, pH 5 being maintained with sodium bicarbonate and the temperature at 20°–25° C. The coupling is complete after 1 hour of stirring and the dyestuff has precipitated virtually quantitatively. It is filtered off with suction to give 900 g of paste of the dyestuff of the formula

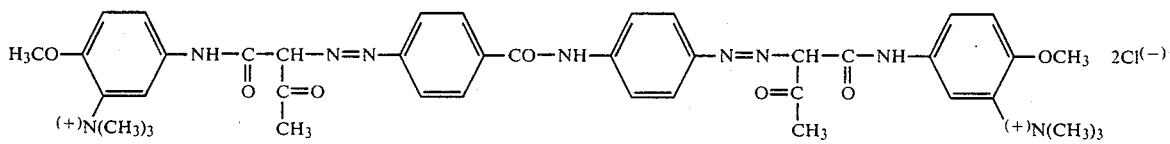

$\lambda_{max}$: 401 nm

The paste can be dried or be directly processed into a solution of, for example, 10% of dyestuff, 25% of for-
mic acids and 65% of water. The powder as well as the solution produce brilliant fast greenish-yellow dyes on cotton, paper, leather and acrylics.

If Example 41 is repeated with the arylides of Examples 2–16 and 19–32 in place of the Example 1 arylide, likewise brilliant greenish-yellow dyestuffs are obtained which have $\lambda_{max}$ values of about 400 nm and the formula

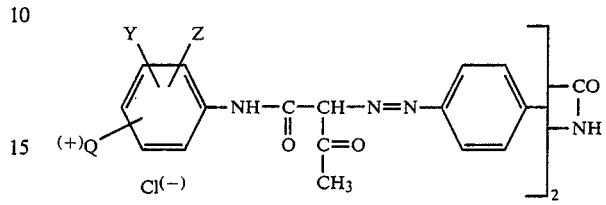

where Q, Y and Z are in each case the substituents of the arylides in Examples 2–16 and 19–32, which dye cotton and paper in fast brilliant yellow shades.

EXAMPLE 42

If dianisidine is used as diazo component and the procedure followed is that of Example 41, this gives the dyestuff of the formula

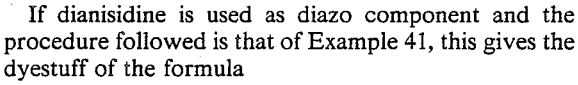
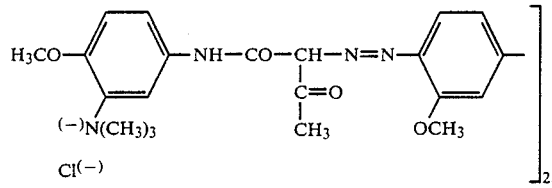

which has a $\lambda_{max}$=443 nm and dyes paper and cotton in bright orange shades.

EXAMPLE 43

If 4,4'-diaminoazobenzene is used as diazo component and the procedure followed is that of Example 41, this gives the dyestuff of the formula

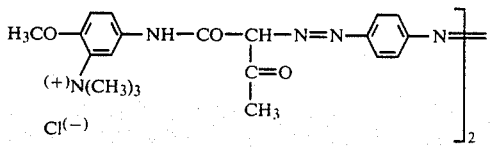

which has a $\lambda_{max}=452$ nm and dyes paper and cotton in fast reddish-orange shades.

EXAMPLE 44

If 2-(4-aminophenyl)-5-aminobenzimidazole is used as diazo component and the procedure followed is that of Example 41, this gives the dyestuff of the formula

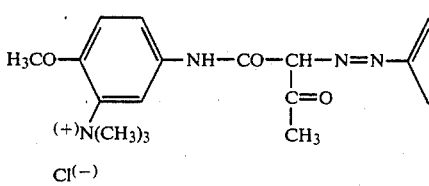

which has a $\lambda_{max}=432$ nm and dyes paper and cotton in reddish-yellow shades which have good fastness properties.

EXAMPLE 45

If 2,4-bis-(4'-aminophenylamino)-6-dimethylaminotriazine is used as diazo component and the procedure used is that of Example 42, this gives the dyestuff of the formula

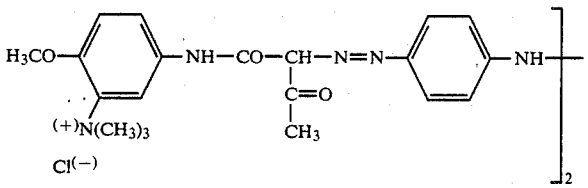

which has a $\lambda_{max}=411$ nm dyes paper and cotton in fast yellow shades.

If Examples 42-45 are repeated with the arylides of Example 2-16 and 19-32, this gives dyestuffs having compatible shades.

EXAMPLE 46

A dry stuff which consists of 60% of mechanical wood pulp and 40% of unbleached sulphite pulp is beaten with water and milled to 40 Schotter-Riegler degrees of fineness in a hollander in such a way that the solids content is slightly above 2.5 and is then standardised with water to 2.5% of the slush pulp.

200 parts of this slush pulp are admixed with 5 parts of a 0.5% strength aqueous acetic acid solution of the dyestuff of Example 41, and the mixture is stirred for about 5 minutes, admixed with 2% of resin size and 3% of alum (relative to dry stuff) and is stirred again for some minutes until homogeneous. The pulp is only diluted with about 500 parts of water and is used to produce, in a customary manner, sheets of paper by sucking off over a sheet former. The sheets of paper have a greenish-yellow colouration. The effluent from the dyeing is virtually free of dyestuff.

EXAMPLE 47

If the dyestuff of Example 37 is used in place of the dyestuff used in Example 46, this likewise gives greenish-yellow sheets of paper and a virtually dyestuff-free effluent.

EXAMPLE 48

The dyeing of unbleached paper pulp under otherwise identical dyeing conditions and when bleached sulphite pulp is used also gives greenish-yellow dyeings on paper and virtually dyestuff-free effluents.

We claim:

1. Cationic dyestuffs of the formula

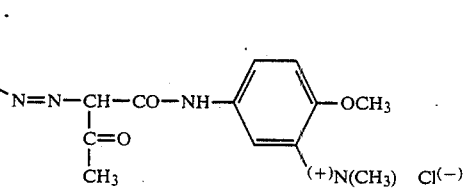

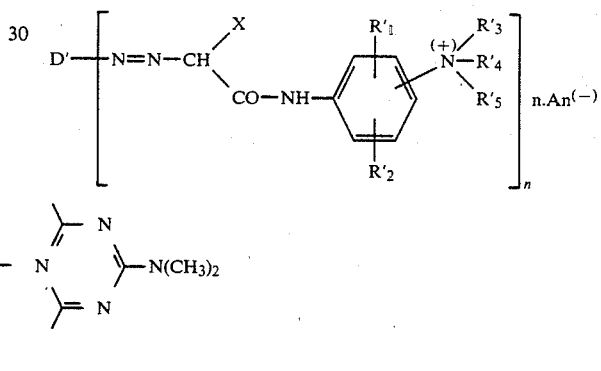

wherein n is 1 or 2,

X is a radical of the formula $COCH_3$, CN, $COOCH_3$, $COOC_2H_5$, $CONH_2$ or $COC_6H_5$ and $An^{(-)}$ is an anion.

D' denotes a radical of the formula

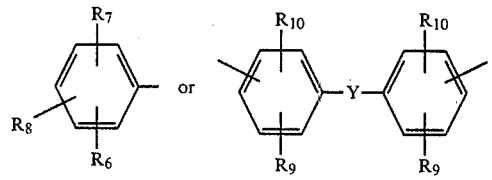

$R_1'$ and $R_2'$ independently of each other denote hydrogen, fluorine, chlorine, bromine, $C_1$- to $C_4$-alkyl or $C_1$- to $C_4$-alkoxy, and $R_3'$, $R_4'$ and $R_5'$ independently of one another denote $C_1$- to $C_4$-alkyl, $C_3$- to $C_4$-alkenyl, benzyl or phenylethyl, either of which can be substituted by hydroxyl, $C_1$- to $C_4$-alkoxy, chlorine, bromine or cyano, and the benzyl and phenylethyl radicals additionally by $C_1$- to $C_4$-alkyl, or $R_3'$ and $R_4'$, together with the nitrogen atom to which they are bonded, form an optionally $C_1$- to $C_4$-alkyl substituted pyrrolidine, morpholine, piperidine or piperazine ring, $R_6$ and $R_7$ independently of each other represent hydrogen, $C_1$- to $C_4$-alkyl, $C_1$- to $C_4$-alkoxy, fluorine, chlorine, bromine or NH-Ac, Ac represents $C_1$- to $C_4$-alkylcarbonyl, -alkylsulphonyl or -alkylcarbamyl, benzoyl, toluoyl, phenylsulphonyl, phenylcarbamoyl, tolylsulphonyl, tolylcarbamyl or optionally substituted triazinyl, $R^8$ represents hydrogen, $C_1$- to $C_4$-alkyl, $C_1$- to $C_4$-alkoxy, chlorine, bromine, NH-Ac or a radical of the formula

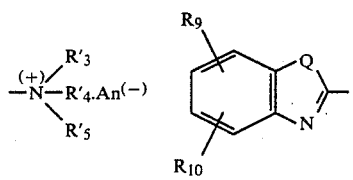

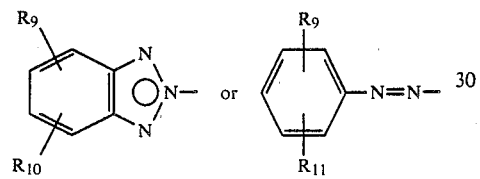

$R_9$–$R_{11}$ independently of one another represent hydrogen, $C_1$- to $C_4$-alkyl, $C_1$ to $C_4$-alkoxy, chlorine or bromine and $R_{11}$ additionally represents.

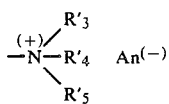

Q represents O, S or NH and
Y represents a direct bond or a bridging link.

2. Cationic dyestuffs of claim 1, where Y represents a direct bond or a bridging link of the formula

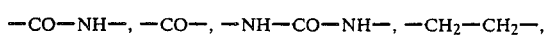

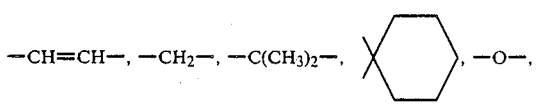

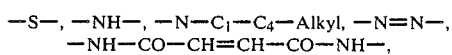

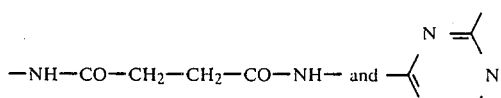

where $R_{12}$ represents alkyl, aryl,

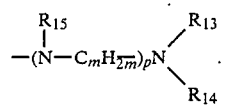

—O—$R_{15}$ or —S—$R_{15}$, m represents 2 or 3, p represents 0 to 1 and $R_{13}$, $R_{14}$ and $R_{15}$ denote hydrogen, alkyl, alkenyl, aryl, aralkyl or cycloalkyl or $R_{13}$ and $R_{14}$, together with the N atom to which they are bonded form a 5- or 6-membered ring or $R_{13}$ denotes amino.

3. Cationic dyestuffs of claim 2, where $R_{12}$ represents $C_1$- to $C_4$-alkyl or phenyl, either of which can be substituted by hydroxyl, $C_1$- to $C_4$-alkoxy, chlorine or bromine and phenyl additionally by $C_1$- to $C_4$-alkyl, or

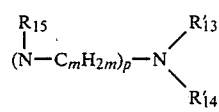

—O—$R_{15}'$ or —S—$R_{15}'$ and $R_{13}'$, $R_{14}'$ and $R_{15}'$ independently of one another denote hydrogen, optionally hydroxyl-, halogen-, cyano- or $C_1$-$C_4$-alkoxy-substituted $C_1$-$C_4$-alkyl, $C_2$-$C_4$-alkenyl or optionally halogen-, $C_1$-$C_4$-alkyl-, hydroxyl- or $C_1$-$C_4$-alkoxy-substituted benzyl, phenylethyl, phenyl, naphthyl or cyclohexyl, or $R_{13}'$ and $R_{14}'$, together with the N atom to which they are bonded, form an optionally $C_1$-$C_4$-alkyl-substituted pyrrolidine, piperidine, morpholine or piperazine, whose external nitrogen atom can be alkylated or quaternised by optionally OH— or NH$_2$-substituted $C_1$-$C_4$-alkyl.

4. Cationic dyestuffs of claim 1, of the general formula

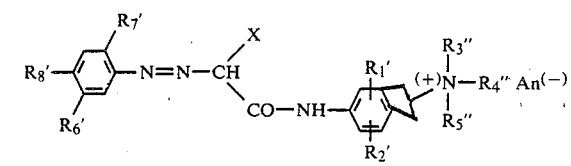

wherein $R_6'$ denotes hydrogen, methoxy, ethoxy, methyl, ethyl, fluorine, chlorine, bromine or NH—Ac, $R_7'$ denotes hydrogen, fluorine, chlorine, bromine, methoxy, ethoxy, methyl or ethyl and $R_8'$ denotes hydrogen, methoxy, ethoxy, methyl, ethyl, of a radical of the formula

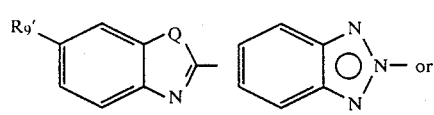

-continued

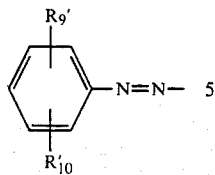

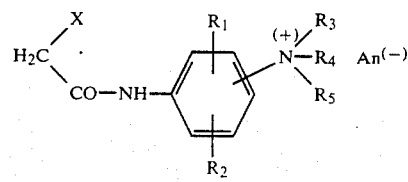

$R_1'$, $R_2'$, $R_9'$ and $R_{10}'$ independently of one another denote hydrogen, fluorine, chlorine, bromine, methoxy, ethoxy, methyl or ethyl and $R_3''$, $R_4''$ and $R_5''$ independently of one another denote $C_1$- to $C_4$-alkyl, $\beta$- or $\gamma$-hydroxy-$C_2$- to $C_4$-alkyl or benzyl, or $R_3''$ and $R_4''$, together with the nitrogen form a pyrrolidine, morpholine or piperidine ring and X and $An^{(-)}$ have the meaning of claim 2.

5. Cationic dyestuffs of claim 4, of the general formula

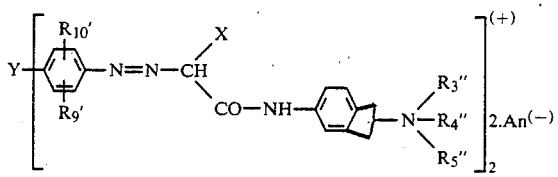

6. Process for preparing cationic dyestuffs of claim 1, characterised in that amines of the formula

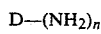

are diazotised and the diazotised products are coupled with compounds of the formula where the symbols have the meaning given in claim 1.

7. Cationic compounds of the general formula

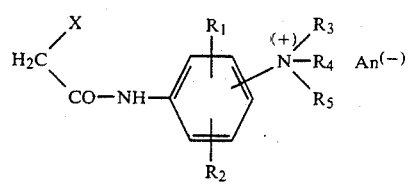

wherein

X is a radical of the formula $COCH_3$, $CN$, $COOCH_3$, $COOC_2H_5$, $CONH_2$, or $COC_6H_5$, $R_1$ and $R_2$ independently of each other are hydrogen or a nonionic substituent and $R_3$, $R_4$ and $R_5$ independently of one another are alkyl, alkenyl or aralkyl, or $R_3$ and $R_4$, together with the nitrogen to which they are bonded, form a 5- or 6-membered heterocyclic ring and wherein the cyclic and acyclic radicals can in turn be substituted.

8. Process for dyeing natural or synthetic cationically dyeable substrates and compositions, characterised in that dyestuffs of claim 1 are used.

9. Cationic dyestuff of claim 1 of the formula

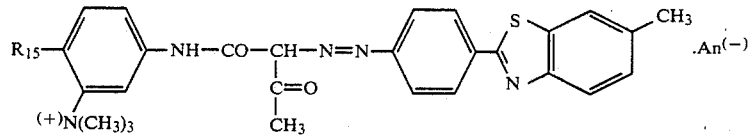

wherein $R_{15}$ denotes hydrogen, methyl, methoxy, ethoxy or chlorine.

* * * * *

UNITED STATES PATENT AND TRADEMARK OFFICE
CERTIFICATE OF CORRECTION

PATENT NO. : 4,509,948
DATED : April 9, 1985
INVENTOR(S) : Peter Wild, et al

It is certified that error appears in the above-identified patent and that said Letters Patent is hereby corrected as shown below:

| | |
|---|---|
| Col. 3, line 63 | Middle of formula delete "Cm" and substitute --$C_m$-- |
| Col. 6, line 39 | Delete "n '2" and substitute --n = 2 -- |
| Col. 10, line 45 | Delete "45°14" and substitute --45°- -- |
| Col. 11, line 50 | Insert "Z" in structure as follows: |

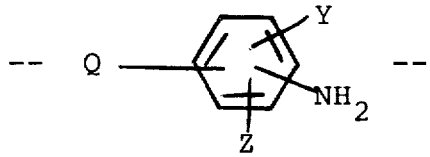

| | |
|---|---|
| Col. 15, line 16 | Delete "Examples" and substitute --Example-- |
| Col. 18, line 52 | After "anion" delete "." |
| Col. 19, line 38 | After "represent" delete "." |
| Col. 21, line 18 | Delete "claim 2" and substitute --claim 1-- |

Signed and Sealed this

Nineteenth Day of November 1985

[SEAL]

Attest:

Attesting Officer

DONALD J. QUIGG

Commissioner of Patents and Trademarks